(12) United States Patent
Abe et al.

(10) Patent No.: US 7,744,978 B2
(45) Date of Patent: Jun. 29, 2010

(54) RESIN MOLDING (75) Inventors: Kenshirou Abe, Ibaraki (JP); Akira Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/253,340

(22) Filed: Oct. 17, 2008

(65) Prior Publication Data
US 2009/0041973 A1   Feb. 12, 2009

Related U.S. Application Data (62) Division of application No. 11/866,531, filed on Oct. 3, 2007, now Pat. No. 7,467,938, which is a division of application No. 10/767,720, filed on Jan. 30, 2004, now Pat. No. 7,300,614.

(30) Foreign Application Priority Data

Feb. 4, 2003   (JP) ............................. 2003-027511

(51) Int. Cl.
B32B 1/06   (2006.01)
(52) U.S. Cl. .......................................... 428/60; 428/57
(58) Field of Classification Search ................... 428/57, 428/60, 120; 264/261–263; 403/268
See application file for complete search history.

(56) References Cited

U.S. PATENT DOCUMENTS

| | | | |
|---|---|---|---|
| 2,040,126 A | 5/1936 | Grieve | 144/330 |
| 3,264,394 A | 8/1966 | Walter | 264/263 |
| 4,377,547 A | 3/1983 | Hervig | 264/262 |
| 4,592,886 A | 6/1986 | Mannherz | 264/262 |
| 5,152,481 A * | 10/1992 | Cote et al. | 244/153 R |
| 5,670,109 A * | 9/1997 | DeRees | 264/261 |
| 5,863,064 A * | 1/1999 | Rheinlander et al. | 280/732 |
| 6,302,680 B1 | 10/2001 | Gellert et al. | 425/549 |
| 6,572,808 B1 | 6/2003 | Saito et al. | 264/261 |
| 6,654,578 B2 * | 11/2003 | Suzuki et al. | 399/111 |
| 7,099,607 B2 | 8/2006 | Suzuki et al. | 399/111 |
| 2003/0091768 A1 | 5/2003 | Sasatani et al. | 428/35.7 |

* cited by examiner

*Primary Examiner*—Alexander Thomas
(74) *Attorney, Agent, or Firm*—Fitzpatrick, Cella, Harper & Scinto (57) ABSTRACT

A resin molding is made by integrally joining a first resin molded part configured with a concave portion and a second resin molded part configured with a convex portion so that the concave portion and the convex portion are mated together. The resin molding includes a cavity that is in communication with the convex portion and the concave portion when the convex and concave portions are mated into each other, and a joining resin filled into the cavity. The first and second molded parts and the joining resin are composed of the same resin or similar resins.

4 Claims, 6 Drawing Sheets

RESIN MOLDING

This application is a divisional of application Ser. No. 11/866,531, filed on Oct. 3, 2007, now U.S. Pat. No. 7,467,938, which is a divisional of application Ser. No. 10/767,720, filed on Jan. 30, 2004, now U.S. Pat. No. 7,300,614.

This application claims priority from Japanese Patent Application No. 2003-027511 filed Feb. 4, 2003, which is incorporated hereinto by reference.

BACKGROUND OF THE INVENTION

1. Field of the Invention

The present invention relates to a resin molding which is difficult to mold integrally and which is obtained by separately molding a plurality of resin molded parts each having a joining portion and mating these joining portions into one another to integrally join the molded parts together, as well as a method of manufacturing this resin molding and a resin injecting apparatus used for this method.

2. Description of the Related Art

It is contemplated that a resin molding that is difficult to mold integrally may be manufactured by separately pre-molding a plurality of resin molded parts, mating joining portions molded in these molded parts into one another, and injecting an adhesive or a resin into these joining portions to integrate the parts. For example, a cassette type toner cartridge 1 such as the one shown in FIG. 1, which is used in an electrophotographic device, comprises a cartridge main body 2 and a side cover 3 disposed at a side of the cartridge main body 2. It is essentially difficult to mold this apparatus in a single injecting step. Thus, attempts are made to separately inject these parts, integrate the parts together using a joining portion 4, and fill a molten resin into the joining portion 4 to secure them.

Attempts are also made to subject such resin moldings to a recycle process to reuse them as new resin moldings if they are damaged or used. What is important in such a recycle process is that the resin molding is composed substantially of a single material. In this connection, for resin moldings designed so that their joining portions are integrally connected together using an adhesive, the adhesive is foreign to the resin constituting the resin molding. This deteriorates recyclability. Resin moldings obtained by injecting the same molten resin as or a molten resin similar to that of the resin molding into the joining portion are more preferable in terms of recyclability.

The use of a hot melting apparatus or an injection molding apparatus is expected as a method of injecting a molten resin into the joining portion between the resin molded parts.

When the hot melting apparatus is used, it is necessary to keep a tip portion of an injection gun of the hot melting apparatus in non-contact with the joining portion between the molded parts and to supply a molten resin from the tip of the injection gun to the joining portion between the molded parts.

Figure 6:
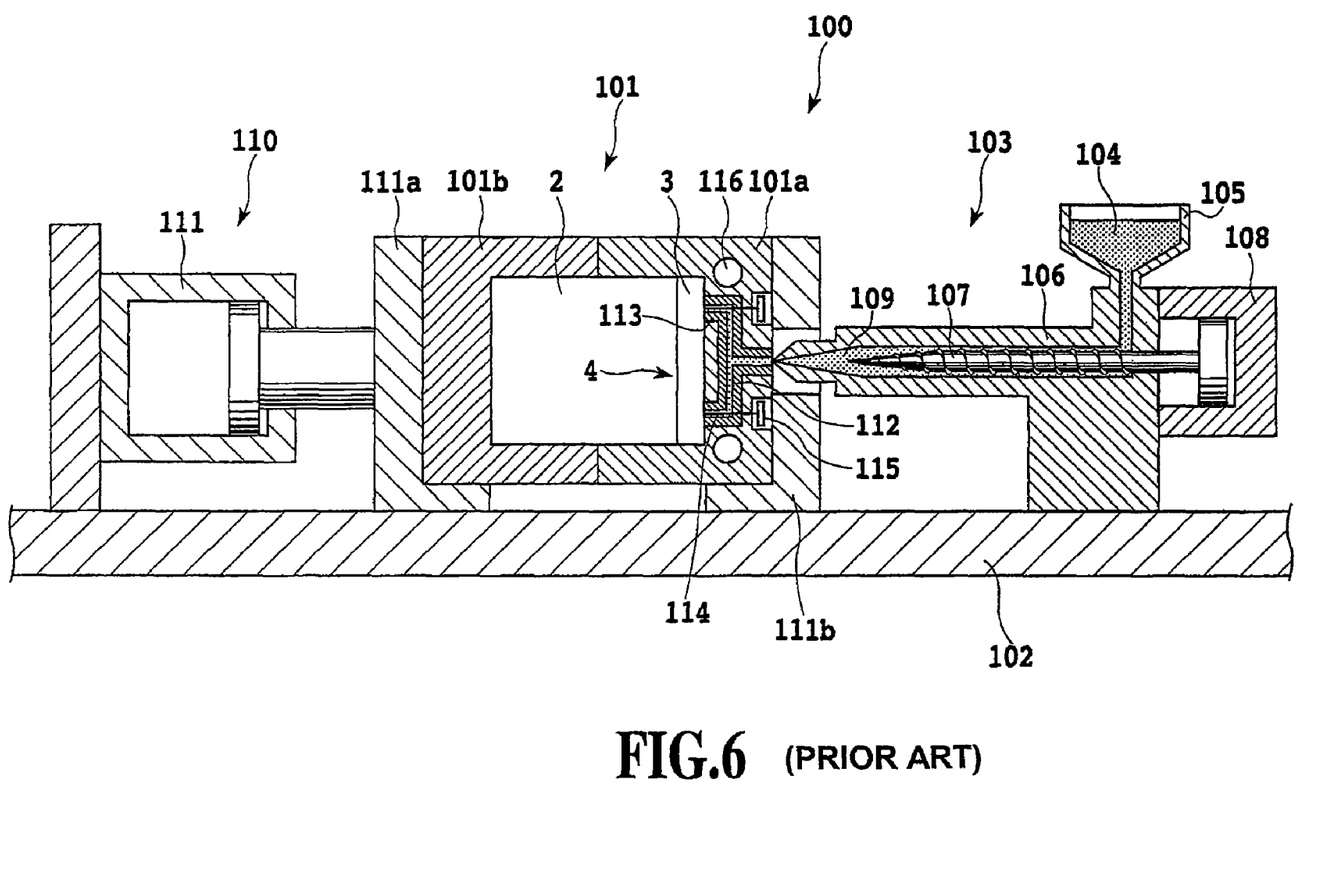
FIG. 6 is a sectional view schematically showing a conventional operation of joining portions of two resin molded parts using an injection molding apparatus.

When a common injection molding apparatus 100 such as the one shown in FIG. 6 is used, a dies set 101 is provided which is composed of a fixed die 101a and a movable die 101b and formed with a cavity corresponding to the cartridge main body 2 and the side cover 3, combined with each other. A resin injecting apparatus 103 is provided on a frame 102 of the injection molding apparatus 100. The resin injecting apparatus 103 comprises a hopper 105 that stores resin pellets 104 in a solid state, a heating cylinder 106 that heats and molds the resin pellets 104, and a screw driving device 108 that rotates and reciprocates a screw 107 arranged inside the heating cylinder 106. The screw driving device 108 advances the screw 107 to meter a molten resin 109. A die open and close driving apparatus 110 comprises a die opening and closing cylinder 111 that reciprocates a movable plate 111a in a longitudinal direction in the FIG. 6. The fixed die 101a is fixed to a fixed plate 111b. The movable die 101b is fixed to the movable plate 111a.

In a molding operation using the injection molding apparatus 100, the movable plate 111a is moved backward, the cartridge main body 2 and the side cover 3 are set in the die 101, and then the movable plate 111a is closed to set the cartridge main body 2 and the side cover 3 in the die 101. The fixed die 111a fixed to the fixed plate 111b has a hot runner 112 heated so as not to solidify the molten resin 109, injected from the heating cylinder 106, a gate 113 following the hot runner 112, a gate pin 114 that opens and closes the gate 113, a gate pin driving cylinder 115 that drives the gate pin 114, and a cooling fluid passage 116 through which a cooling fluid is passed to cool the gate 113. Accordingly, after the gate 113 has been opened using the gate pin 114, the molten resin 109 can be injected into the joining portion 4 between the cartridge main body 2 and the side cover 3. After the molten resin 109 has completely been injected, the gate pin 114 is advanced to close the gate 113. Then, the molten resin 109 filled into the joining portion 4 is thus cooled and solidified to integrate the cartridge main body 2 with the side cover 3. Subsequently, the die opening and closing cylinder 111 is activated to move the movable plate 111a backward. The movable die 101b fixed to the movable plate 111a is thus opened to allow the integrated cartridge main body 2 and side cover 3 to be removed.

Figure 1:
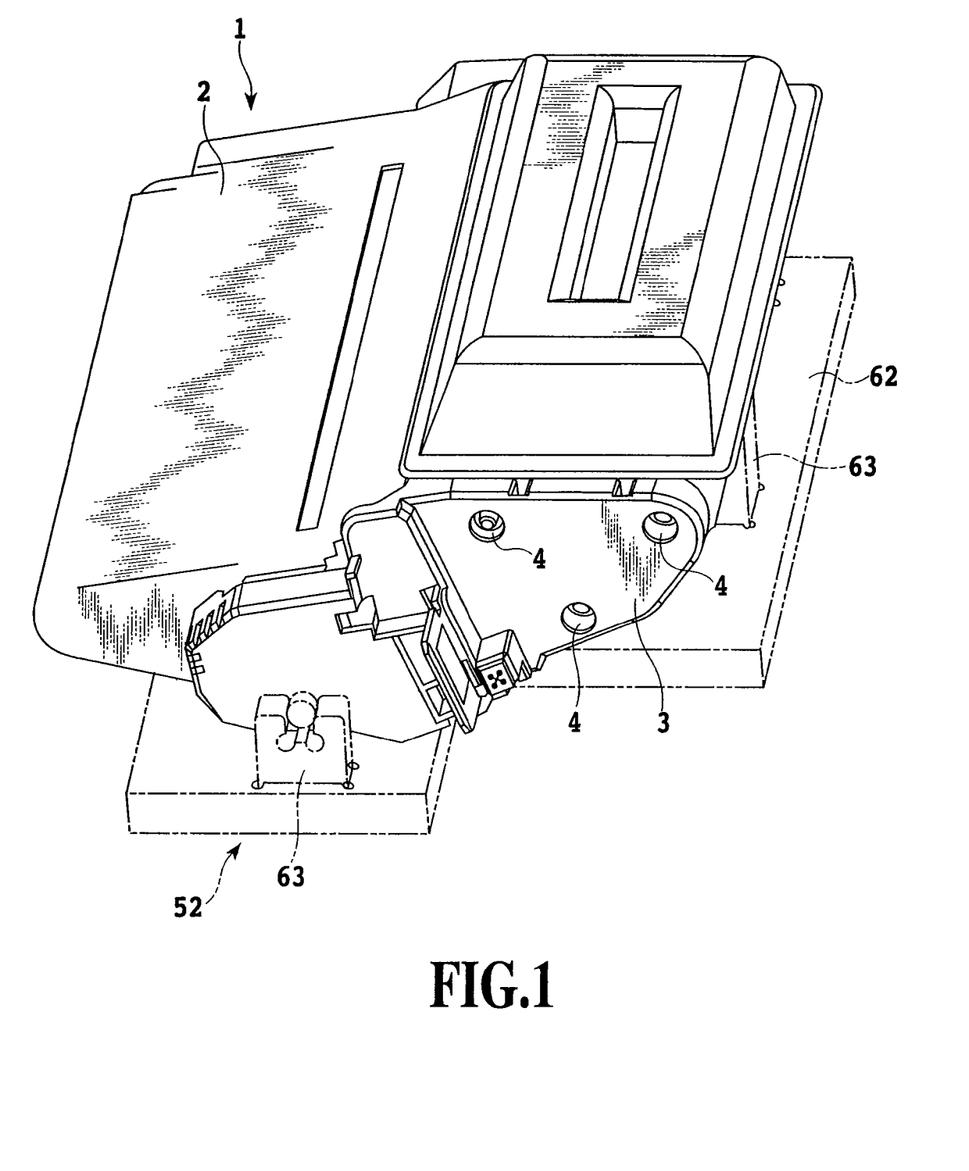
FIG. 1 is a projection view illustrating the appearance of a toner cartridge to which the present invention is applied.

When the hot melt apparatus is used to fill the molten resin into the joining portion 4 between the cartridge main body 2 and the side cover 3 as shown in FIG. 1, a tip portion of an injection gun of the hot melt apparatus must be kept in non-contact with the joining portion 4 between the cartridge main body 2 and the side cover 3. Thus, depending on the shapes of a cavity in the joining portion 4 into which the molten resin is filled or the viscosity of the molten resin, it may be difficult to completely fill the molten resin into these cavities or appropriately maintain the esthetics of the surface of the joining portion after the injection.

On the other hand, when the injecting molding apparatus 100 as shown in FIG. 6 is utilized to inject the molten resin 109 into the joining portion 4 between the cartridge main body 2 and the side cover 43, such inconveniences do not occur as occur if the above-described hot melt apparatus is used. However, the injection molding apparatus 100 for molding and injecting the resin pellets 104 into the joining portion 4 further incorporates the hot runner 112 that guides the molten resin 109 to the joining portion 4, and the like. The injection molding apparatus 100 also requires the dies set 101 for holding the toner cartridge 1. Thus, disadvantageously, a dedicated facility is required, thus increasing installation spaces and facility costs. Furthermore, the injection molding apparatus itself is expensive and cumbersome to handle.

SUMMARY OF THE INVENTION

A first aspect of the present invention is a method of manufacturing a resin molding made by integrally joining a first resin molded part and a second resin molded part together via their joining portions, the method comprises a step of molding a concave portion as the joining portion when molding the first molded part, a step of molding a convex portion which has a through-hole in a central portion thereof as the joining portion when molding the second molded part, a step of mating the concave portion of the first molded part with the convex portion of the second molded part so that a cavity being in communication with one end of the through-hole is configured between the concave portion and the convex portion, a step of holding, with a jig, the first and second molded parts mating the concave portion with the convex portion so as to form the cavity therebetween, a step of connecting a tip of an injection nozzle to the other end of the through-hole, the injection nozzle being used to inject a molten resin into the cavity between the first and second molded parts held by the jig, and a step of filling the molten resin into the through-hole and the cavity from the injection nozzle so that the concave and convex portions are integrally joined by the molten resin.

In the method according to the first aspect of the present invention, the resin molding is obtained by mating the convex portion formed in the first molded part with the corresponding convex portion formed on the second molded part, holding the mated first and second molded parts by the jig, then connecting the injection nozzle with one end of the through-hole which the other end is in communication with the cavity, injecting the molten resin into the through-hole and the cavity from the injection nozzle, and integrally joining the first and second molded parts, as the resin molding, via the concave and convex portions by the resin.

According to the present invention, the resin molding of a complicated shape can be efficiently and inexpensively manufactured without using any special dies or the like. Consequently, a very recyclable resin molding can be manufactured.

In the method of manufacturing a resin molding according to the first aspect of the present invention, the first molded part, the second molded part, and the molten resin may be made of the same resin or similar resins in that the resin molding can be easily processed for recycling. In terms of material costs and handling easiness, these same or similar resins are particularly preferably polystyrenes, polypropylenes, polyethylenes, ABS resins, modified PPE resins, or composite resins of ABS and polycarbonate.

The method of manufacturing the resin molding may further comprise a step of interposing a thermal insulating bush between the injection nozzle which is connected to the other end of the through-hole in order to inject the molten resin into the cavity from the through-hole, and the convex portion to suppress a rise in temperature of the second resin molded part. In this case, the method of manufacturing the resin molding may further comprise a step of flowing a coolant through the thermal insulating bush so that a temperature of the thermal insulating bush is lower than that of the molten resin. For this reason, it is possible to prevent the second molded part from being disadvantageously thermally deformed.

A second aspect of the present invention is a resin molding made by integrally joining a first resin molded part configured a concave portion and a second resin molded part configured a convex portion so that the concave portion and the convex portion are mated together, the resin molding comprises a cavity that is in communication with the convex portion and the concave portion when the convex and concave portions are mated into each other, and a joining resin filled into the cavity, and wherein the first and second molded parts and the joining resin are composed of the same resin or similar resins.

Such resin molding can be collectively processed during recycling and are thus suitable for recycling. In particular, when polystyrenes, polypropylenes, polyethylenes, ABS resins, modified PPE resins, or composite resins of ABS and polycarbonate as the same resin or similar resins are used, the resin molding which can be easily processed at low cost is obtained.

In the above-mentioned resin moldings, the resin molding may comprise a plurality of joining portions in order to increase a bonding strength of the first and second molded parts.

A third aspect of the present invention is a resin injecting apparatus which comprises a resin injecting nozzle for injecting a molten resin into a cavity configured between a first resin molded part and a second resin molded part connected to the first molded part, from a through-hole configured in the second molded part, an ejection plunger for ejecting a predetermined amount of molten resin from the resin injecting nozzle, a thermal insulating bush attached to the resin injecting nozzle, a coolant passage which is formed in the thermal insulating bush and through which a coolant is passed, and coolant supplying means for supplying the coolant to the coolant passage.

According to the resin injecting apparatus of the present invention, the thermal insulating bush can prevent heat from the resin injecting nozzle or radiant head from being transmitted to the second resin molded part. This prevents the molten resin from leaking from pressed-against surfaces of the other end of the through-hole and the injecting nozzle to the exterior of the through-hole.

In the resin injecting apparatus according to the third aspect of the present invention, the thermal insulating bush may have a cylindrical portion surrounding a circumference of the through-hole, and a bottom surface of the cylindrical portion may abut on an end surface of the second molded part in which the other end of the through hole is open. This enables the resin injecting nozzle to be positioned relative to the through-hole. It is thus possible to prevent the molten resin from leaking from pressed-against surfaces of the other end of the through-hole and the injecting nozzle to the exterior of the through-hole.

In the above-mentioned resin injecting apparatus, the resin injecting apparatus may further comprise a thermal insulating member provided on the thermal insulating bush and abutted on the first molded part. In this case, the thermal insulating bush and the thermal insulating member can reliably insulate heat from the resin injecting nozzle. This makes it possible to prevent the second molded part from being thermally deformed.

The resin injecting apparatus may further comprise a jig for holding at least one of the first and second molded parts. In this case, the resin injecting nozzle can be positioned relative to the through-hole. This also makes it possible to prevent the molten resin from leaking from the through-hole.

The number of the resin injecting nozzles and the number of the ejection plungers may correspond to the number of through-holes configured in the second molded part. Workability and working efficiency can be improved by simultaneously injecting the molten resin through all the through-holes.

The above and other objects, effects, features and advantages of the present invention will become more apparent from the following description of embodiments thereof taken in conjoining portion with the accompanying drawings.

DETAILED DESCRIPTION OF PREFERRED EMBODIMENTS

With reference to FIGS. 1 to 5, a detailed description will be given of an embodiment in which a method of manufacturing a resin molding according to the present invention is applied to the toner cartridge 1 of the electrophotograhic device as shown in FIG. 1. However, the present invention is not limited to this embodiment. It is possible to subject the embodiment to all alterations or modifications included in the concept of the present invention described in the specification. Thus, naturally enough, the present invention is applicable to other techniques belonging to the spirits of the present invention.

Figure 2:
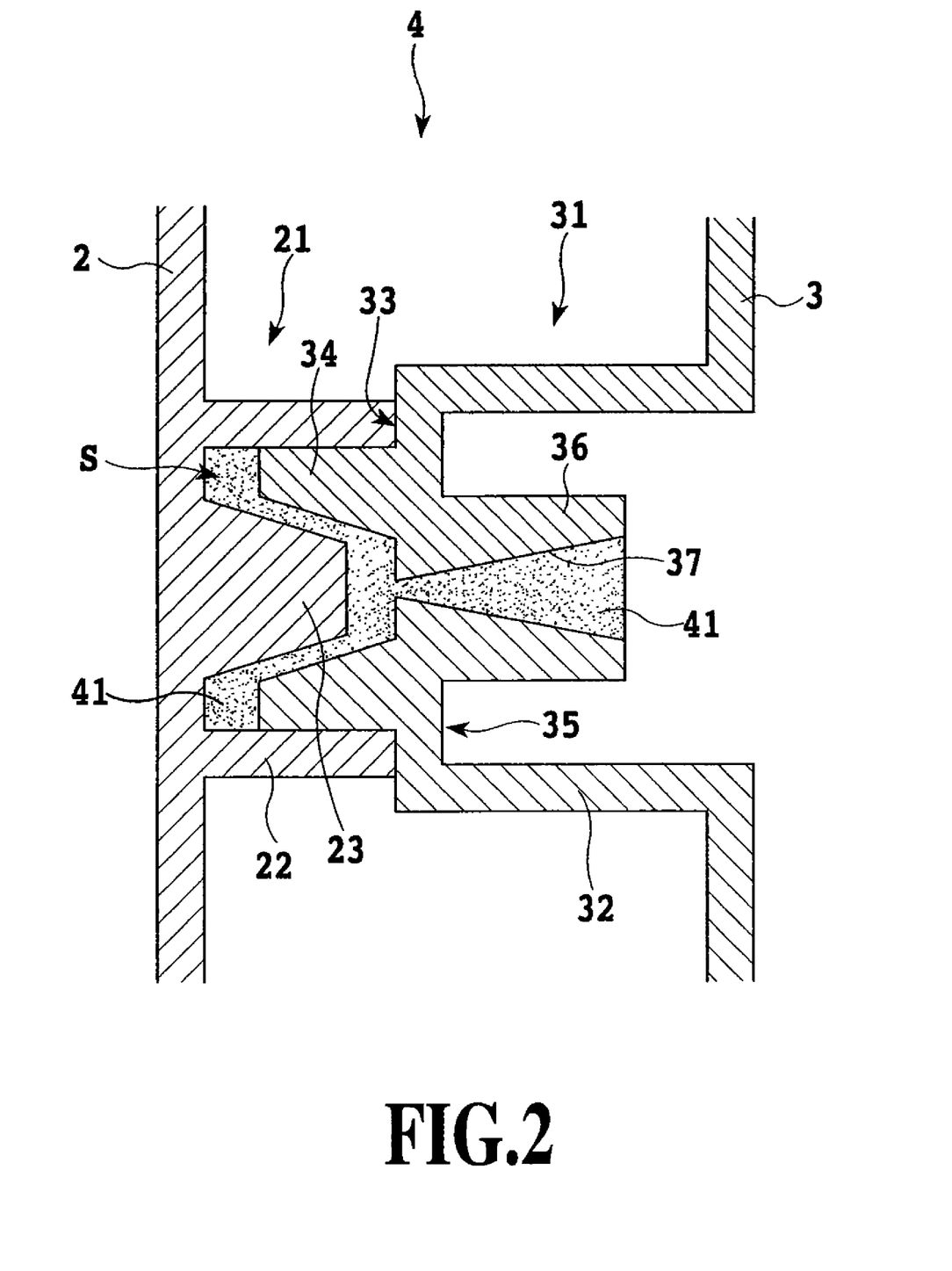
FIG. 2 is a sectional view illustrating the structure of the joining portion between a cartridge main body and a side cover constituting the toner cartridge shown in FIG. 1.

FIG. 1 shows the appearance of the toner cartridge 1 according to the present embodiment. FIG. 2 shows the sectional structure of the joining portion 4 between the cartridge main body 2 and the side cover 3. As described previously, the toner cartridge 1 according to the present embodiment comprises the cartridge main body 2 and the side cover 3 disposed at the side of the cartridge main body 2. The cartridge main body 2 and the side cover 3 are separately injected and then integrated into the toner cartridge 1.

The joining portion 4 between the cartridge main body 2 and the side cover 3 is composed of a cylindrical concave portion 21 projected from the cartridge main body 2, a convex portion 31 projected from the side cover 3, and a joining resin 41 filled into a cavity configured between the concave portion 21 and the convex portion 31, i.e. a space S when the portions 21 and 31 are fitted into each other. In the present embodiment, the cartridge main body 2, the side cover 3, and the joining resin 41 are all formed of the same material.

The convex portion 31, molded integrally with the side cover 3, comprises a pedestal 32 projecting from a surface of the side cover 3 and having a cylindrical cross section, a fitting sleeve 34 projecting further outward from an inner end surface 35 of the pedestal 32, and a cylindrical gate bush 36 projecting from the inner end surface 35 of the pedestal 32 in the direction opposite to that of the fitting sleeve 34 and located inside the pedestal 32. In the present embodiment, the outer diameter of the fitting sleeve 34 is set to be smaller than that of the pedestal 32. The outer diameter of the gate bush 36 is set to be further smaller than that of the fitting sleeve 34. A molten resin 41' is supplied via the gate bush 36.

The concave portion 21, injected integrally with the cartridge main body 2, comprises a fitting sleeve 22 projecting from the side wall of the cartridge main body 2 and a projection 23 projecting from the side wall of the cartridge main body 2 concentrically with the fitting sleeve 22. The outer diameter dimension of the fitting sleeve 34 of the convex portion 31 and the inner diameter dimension of the fitting sleeve 22 of the concave portion 21 are appropriately set so that the fitting sleeve 34 of the convex portion 31 can be closely fitted into the fitting sleeve 22 of the concave portion 21. Moreover, after the fitting sleeve 34 of the convex portion 31 has been fitted into the fitting sleeve 22 of the concave portion 21, the tip of the fitting sleeve 22 of the concave portion 21 abuts on an outer end surface 33 of the pedestal 32 of the convex portion 31. Furthermore, an appropriate spacing is formed between the inner peripheral surface of the fitting sleeve 34 of the convex portion 31 and the outer peripheral surface of the projection 23 of the concave portion 21 as the space S so as to allow the molten resin 41' to be filled into the space S through a tapered hole 37 in the gate bush 36 which is a through-hole according to the present invention.

Figure 3:
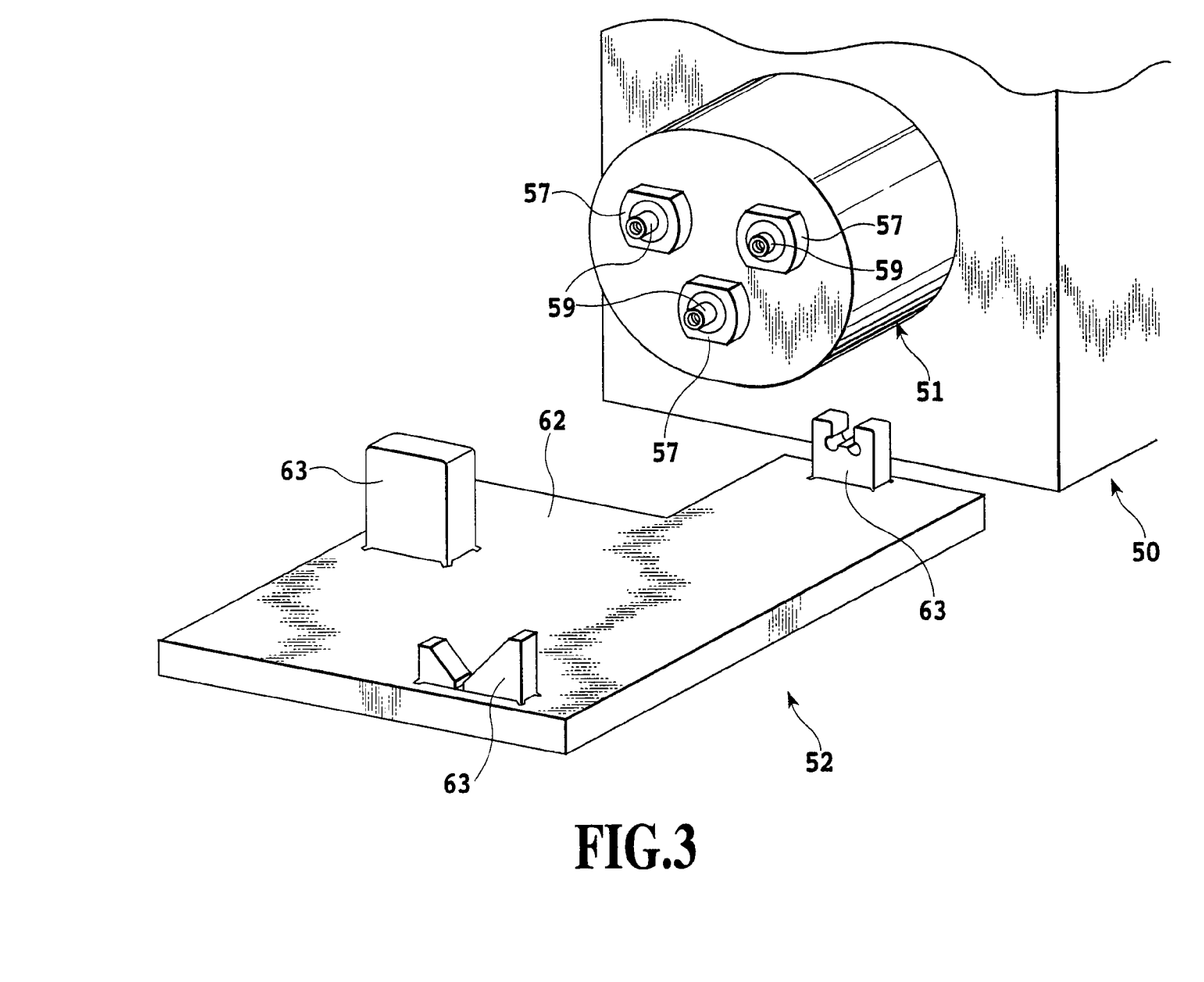
FIG. 3 is a sectional view illustrating an operation of joining the joining portions shown in FIG. 2 using the resin injecting apparatus shown in FIG. 4.

FIG. 3 shows the appearance of a resin injecting apparatus according to the present embodiment which forms the joining portion 4. FIG. 3 shows the sectional structure of a tip portion of the resin injecting apparatus together with the cartridge main body 2 and the side cover 3, provided as a work piece. A resin injecting apparatus 50 according to the present embodiment comprises a hopper (not shown) for storing resin pellets (not shown), a heating cylinder (not shown) for heating and melting the resin pellets accommodated in the hopper, a pellet supplying section (not shown) for supplying the heating cylinder with the resin pellets stored in the hopper, a resin injecting portion 51 for injecting the molten resin 41' from the heating cylinder, and a positioning jig 52 on which the cartridge main body 2 connecting to the side cover 3 via the joining portion 4 is supported. An injecting operation of the molten resin 41' using the resin injecting apparatus 50 is performed while the cartridge main body 2 connecting to the side cover 3 is mounted on the positioning jig 52.

The resin injecting portion 51 according to the present embodiment, in which a heater (not shown) for thermal insulation is incorporated, comprises a metering section 54 having an injection pin 53 driven when the molten resin 41' is injected, a resin injection nozzle 55 through which the molten resin 41' is injected, a nozzle pin 56 that opens and closes the resin injection nozzle 55, and a thermal insulating bush 57 attached to a tip portion of the resin injection nozzle 55. When the nozzle pin 56 is moved backward to open the resin injection nozzle 55, the communication between the above-described pellet supplying section and heating cylinder is blocked. The movement stroke of the injection pin 53 is set in association with the volumes of the space S and the tapered hole 37. As the pellet supplying section supplies the resin pellets to the heating cylinder, the injection pin 53 is moved backward (in FIG. 3, upward) to its backward end. A coolant passage 58 through which a coolant such as water or air is passed is formed in the thermal insulating bush 57, which surrounds the resin injection nozzle 55, so as to surround the resin injection nozzle 55. Coolant supplying means (not shown) is connected to the coolant passage 58. The coolant is passed through the coolant passage 58. The thermal insulating bush 57 according to the present embodiment has a cylindrical portion 59 that can be fitted into the pedestal 32 of the convex portion 31 of the side cover 3. The thermal insulating bush 57 is set so that by abutting the proximal surface of the gate bush 36, fitted into the cylindrical portion 59, against the bottom surface of the cylindrical portion 59, the outer peripheral end of the resin injection nozzle 55 is closely abutted on the inner peripheral surface of the tapered hole 37 in the gate bush 36. A thermal insulating member 61 surrounding the cylindrical portion 59 is further attached on a surface of the thermal insulating bush 57. When the molten resin 41' is injected, the insulating member 61 is abutted against the side cover 3 to stabilize the relative position of the resin injection nozzle 55 of the resin injecting apparatus 50 relative to the side cover 3. This also minimizes the thermal deformation of the side cover 3.

The positioning jig 52 according to the present embodiment, which acts as supporting means, comprises a base plate 62 and a plurality of (in the illustrated example, three) locating blocks 63 projected from the base plate 62 to allow the cartridge main body 2 to be mounted on the base plate so as to position the respective predetermined areas of the cartridge main body 2 and the side cover 3. Considerations are given for the mount positions, support positions, and the like of these locating blocks 63, which support the cartridge main body 2 and the side cover 3, so as to prevent the cartridge main body 2 and the side cover 3 from moving relative to the positioning jig 52 when the molten resin 41' is injected.

In the injecting operation, the cartridge main body 2 connecting to the side cover 3 via the joining portion 4 is placed on the positioning jig 52 at a predetermined position. In this state, the positioning jig 52 is moved and held as shown in FIG. 3 so that the gate bush 36 of the side cover 3 is mated into the cylindrical portion 59 of the thermal insulating bush 57 of the resin injecting apparatus 50. Then, the nozzle pin 56 is moved backward to move the injection pin 53 from its backward end to its forward end (toward the nozzle pin 56). The molten resin 41' is thus completely filled into the space S from the resin injection nozzle 55 via the tapered hole 37 in the gate bush 36. Once the injection pin 53 reaches its forward stroke end, the nozzle pin 56 is moved forward to block the resin injection nozzle 55. Thus, the filling operation of the molten resin 41' is finished. In this case, the thermal insulating bush 57 is covered over the tip portion of the resin injection nozzle 55. Accordingly, the resin injection nozzle 55 can be efficiently cooled by the thermal insulating bush 57. The molten resin 41' injected into the tapered hole 37 can thus be easily separated from the tip of the resin injection nozzle 55.

The molten resin 41' filled into the tapered hole 37 and the space S is cooled and solidified to complete integrating the concave portion 21 with the convex portion 31. Then, the positioning jig 52 is separated from the resin injection apparatus 50 to separate the tip of the resin injection nozzle 55 in the resin injecting apparatus 50 from the joining resin 41 filled into the tapered hole 37.

Figure 4:
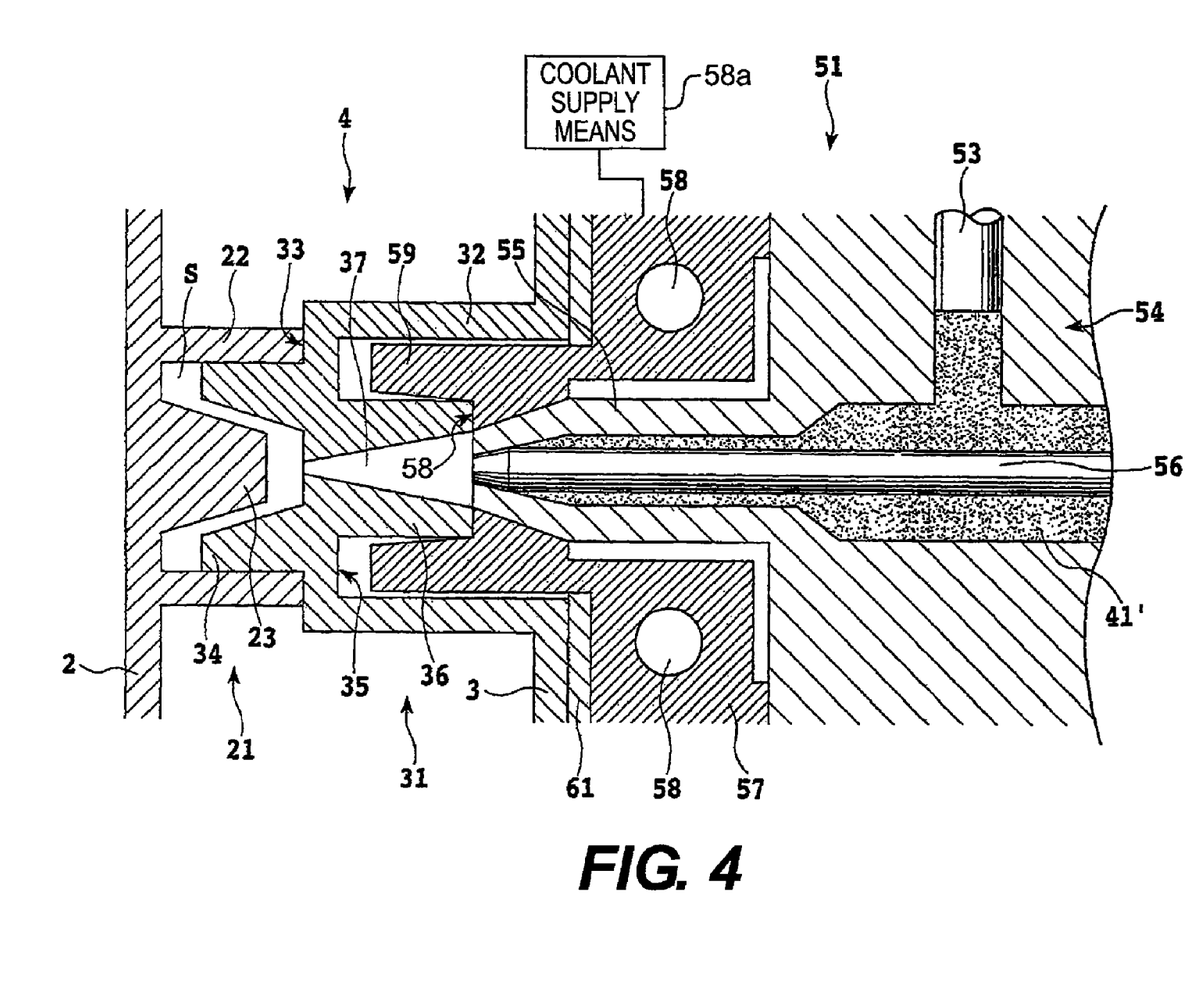
FIG. 4 is a projection view illustrating the appearance of essential components of a resin injecting apparatus that joins the joining portions shown in FIG. 2.

In the resin injecting apparatus 50, shown in FIG. 4, the thermal insulating member 61 abutting on the surface of the side cover 3 is mounted on the thermal insulating bush 57 to hinder the side cover 3 from being thermally deformed. However, it is also effective to thermally insulate the side cover 3 from the resin injecting portion 51 by forming a gap between the surface of the side cover 3 and the thermal insulating bush 57.

Figure 5:
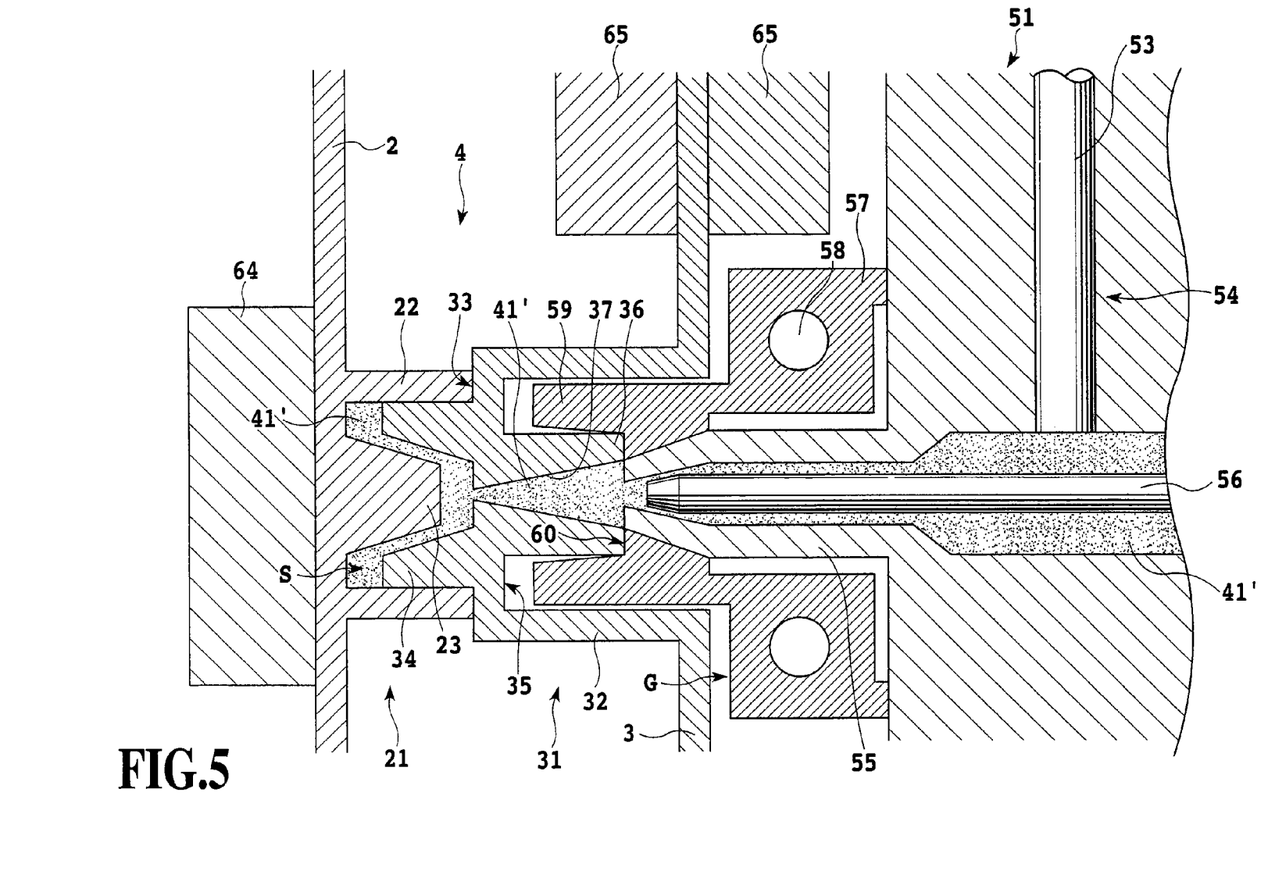
FIG. 5 is a sectional view illustrating an operation of joining the joining portions shown in FIG. 2 using another embodiment of a resin injecting apparatus.

FIG. 5 shows the sectional structure of essential components of another embodiment of the resin injecting apparatus 50 together with the above-described cartridge main body 2 and side cover 3. Elements having the same functions as those of the above-embodiment are denoted by the same reference numerals with their duplicate description omitted. After the resin injecting apparatus 50, shown in FIG. 5, has been positioned on the side cover 3, the thermal insulating bush 57 has only the bottom surface 60 of its cylindrical portion 59 abutted on the end surface of the gate bush 36 of the side cover 3. A thermal insulating gap G is formed between the surface of the side cover 3 and the thermal insulating bush 57. In the present embodiment, to stably support the cartridge main body 2 and the side cover 3 when the molten resin 41' is, injected, a locating block 64 and a pair of locating blocks 65 are further provided on a base plate 62 of the positioning jig 52. The locating block 64 contacts with the opposite surface of the concave portion 21 of the cartridge main body 2 and the pair of locating blocks 65 supporting the side cover 3 so that its front and back surfaces are both sandwiched between the blocks.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall with in the true spirit of the invention.

What is claimed is:

1. A resin molding made by integrally joining a first resin molded part configured with a cylindrical concave portion and a second resin molded part configured with a convex portion so that the cylindrical concave portion and the convex portion are mated together, the resin molding comprising:

a cavity that is in communication with the convex portion and the cylindrical concave portion when the convex and concave portions are mated into each other, the cylindrical convex portion having a pedestal, a bush which projects from an inner end surface of the pedestal, and a flow passage which passes through a central portion of the bush for injecting a molten resin; and a joining resin filled into the cavity, and wherein the first and second molded parts and the joining resin are composed of the same resin or similar resins.

2. A resin molding as claimed in claim 1, further comprising a plurality of joining portions in order to increase a bonding strength of the first and second molded parts.

3. A resin molding as claimed in claim 1, wherein the same or similar resins are polystyrenes, polypropylenes, polyethylenes, ABS resins, modified PPE resins, or composite resins of ABS and polycarbonate.

4. A resin molding as claimed in claim 3, further comprising a plurality of joining portions in order to increase a bonding strength of the first and second molded parts.

* * * * *